Patented Oct. 15, 1946

2,409,429

UNITED STATES PATENT OFFICE 2,409,429

PRODUCTION OF HYDROCYANIC ACID

Howard Donovan Green, Pasadena, Calif., and Philip Roe Hendrixson, Moundsville, W. Va., assignors to E. I. du Pont de Nemours & Company, Wilmington, Del., a corporation of Delaware No Drawing. Application October 30, 1944, Serial No. 561,152

7 Claims. (Cl. 23—151)

This invention relates to the production of hydrocyanic acid, and more particularly it relates to improvements in the process of producing hydrocyanic acid by the reaction of nitric oxide with a gaseous hydrocarbon.

The U. S. patent to Burritt S. Lacy No. 2,076,953 discloses a process for the production of hydrocyanic acid which comprises reacting a mixture containing nitric oxide and a gaseous hydrocarbon, and preferably also one or more of the gases, water vapor, oxygen and nitrogen in the presence of a catalyst containing one or more metals of the platinum group. Preferably this process is carried out in two stages comprising, first, the oxidation of ammonia with air to produce a gaseous mixture containing nitric oxide, and water vapor, and probably also containing unreacted nitrogen and oxygen, and secondly, reacting a mixture comprising a gaseous hydrocarbon and the partially cooled ammonia oxidation products in the presence of a catalyst containing a metal from the platinum group supported on a refractory bed in a suitable refractory lined converter chamber.

In accordance with the process of the above-mentioned Lacy patent, the reaction of the gaseous mixture containing nitric oxide and hydrocarbon, to produce hydrocyanic acid, is preferably carried out at a temperature of about 800° C. to 1400° C. This reaction is, therefore, generally carried out in a converter lined with a refractory material, for example, an aluminum silicate, such as sillimanite, kyanite or mulite.

The process disclosed in the Lacy patent will operate to good efficiency for a period of 8 to 14 days after which the efficiency falls off and the yield of hydrocyanic acid (based on the quantity of nitric oxide or hydrocarbon used) becomes progressively lower.

It has now been discovered that when the gaseous reaction mixture containing nitric oxide and hydrocarbon is reacted in the refractory lined converted chamber at a temperature of between 800° C. and 1400° C. over an extended period of time (a period in excess of about 8 days), the nitric oxide and the gaseous hydrocarbon are preignited to form products which can no longer react to form hydrocyanic acid. This preignition takes place as a result of continued contact of the gaseous reaction mixture with the refractory lining of the converter chamber before the gases have reached the catalyst bed.

It is an object of this invention to provide an improved method for the production of hydrocyanic acid.

It is another object of the invention to reduce the preignition of gaseous reactants resulting from contact thereof with refractory converter walls in the production of hydrocyanic acid from a gaseous mixture containing nitric oxide, and a gaseous hydrocarbon.

It is another object of the invention to improve the yield of hydrocyanic acid which may be obtained from the catalytic reaction of a gaseous mixture comprising nitric oxide, gaseous hydrocarbon, water vapor, oxygen and nitrogen.

It is a still further object of the invention to improve the yield of hydrocyanic acid which may be obtained from the catalytic reaction of a mixture of gases comprising a hydrocarbon and the gases obtained by oxidizing ammonia with an excess of air.

Other objects of the invention will appear hereinafter.

The above objects may be accomplished, in accordance with the present invention, by reacting a gaseous mixture containing nitric oxide and a hydrocarbon, and preferably also containing one or more of the gases, water vapor, oxygen and nitrogen, at a temperature of about 800° C. to 1400° C., in a converter lined with a refractory material and containing therein a catalyst bed comprising a metal of the platinum group, and, as the yield of hydrocyanic acid drops to an undesirably low level, stopping said reaction, abrading surfaces of the walls of the refractory lining which contact the gaseous reaction mixture before it contacts the catalyst bed, and resuming said reaction.

It has also been found desirable to cover the catalyst material which constitutes the catalyst bed with a layer of an inert refractory material and periodically to remove this layer and replace the same. This layer may advantageously be composed of fused silica, aquamarine beryl or fused alumina. The layer of inert refractory material should be sufficiently thick (¾ inch or more) that at least the upper portion thereof can be removed without disturbing or displacing the material of the catalyst bed. The layer of inert refractory material will prevent disturbance of the catalyst bed by the movement of the gaseous reactants through the converter; however, if this layer is not replaced periodically preignition of the gaseous reactants will take place on the surface thereof. At least the top portion of the refractory material of this layer should be renewed whenever the refractory walls of the converter are abraded in order to avoid preignition of reacted gases.

The many detailed refinements in the production of hydrocyanic acid described and discussed in the above-said Lacy Patent No. 2,076,953 will not be repeated here, since such details constitute no particular part of the present invention.

In producing hydrocyanic acid by the above-described process, or by the process of the Lacy patent, the yield of hydrocyanic acid (based on the input of nitric oxide or hydrocarbon) will gradually drop after operating for a period of about 8 to 14 days. In one actual analysis of the gas mixture entering the catalyst bed, after the operation was continued for a long period of time, it was found that 20% of the NO content and 40% of the hydrocarbon content of the entering gases were lost by preignition. When the yield of hydrocyanic acid becomes undesirably low, for example, after operating for a period of several weeks, the flow of reaction gases to the converter chamber is stopped and the latter is cooled. Preferably, the cooling is accomplished by first passing preheated air, for example, at a temperature of around 200° C., through the converter, followed by air of room temperature until cool. After the converter has cooled sufficiently to permit scraping, or otherwise abrading, the walls, the converter is opened and such walls as contact the gases before the latter can reach the catalyst bed are abraded. The top portion of the inert layer of refractory material covering the catalyst bed is simultaneously removed and replaced with fresh inert refractory material. Inert refractory material which has been used can be refreshed by steeping the same for a period of about ½ hour in aqua regia.

In abrading the surfaces of the refractory walls, it is preferred that all deposits and discolorations be removed therefrom. The abrasion may be accomplished by means of a hand or mechanical scraper, by grinding, honing or the like. If a scraper is used, which leaves a rough surface on the refractory walls, it is preferred to smooth the rough surface by grinding or honing. It is also preferred to coat the abraded and smoothed walls of the converter with a slip of a finely divided refractory material, or with a liquid, air-setting, refractory cement.

The following detailed example is given to illustrate the operation of the process of the present invention, it being understood, of course, that these details are not to be considered as limitations of the invention:

Example I

A mixture of gases comprising two volumes of natural gas added to the product from a standard ammonia oxidation unit produced from 10 volumes of air and one volume of ammonia is reacted by passing the same through a catalyst bed comprising a platinum-rhodium (80–20) alloy, supported on natural beryl and covered with a one inch thickness of ¼ inch particles of fused silica in a converter lined with prefired sillimanite. The reaction is carried out at a temperature of 1190° C. for a period of 7 days. About 70½% of the nitric oxide is converted to hydrocyanic acid during this period. The reaction is continued for an additional 27 days after which the yield of hydrosyanic acid has dropped to about 65% (based on the nitric oxide). The converter is now cooled by passing, first air at 200° C. followed by air at room temperature, through the converter until it is cooled sufficiently to permit scraping of the walls of sillimanite refractory. The converter is then opened and the refractory is scraped until a new refractory surface is exposed throughout the interior of the converter. The scraped surface is then smoothed by rubbing the same with emery stone, and the cleaned and smoothed surface coated with a sillimanite air-setting cement. The top ½ inch of the fused silica, catalyst-covering layer is removed and replaced with newly prepared fused silica. The converter is then closed and again brought to operating temperature by again passing a similar mixture of gases through the converter. The yield of hydrocyanic acid (based on the nitric acid) is again found to be 70% of the theoretical.

By the present invention refractory-lined converters can be brought back to original efficiency for the production of hydrocyanic acid from gaseous mixtures containing nitric oxide and a hydrocarbon as many times as the refractory lining will withstand the mechanical abrasion necessary to thoroughly clean the same. It was known, prior to this invention, that the production of hydrocyanic acid from nitric oxide and hydrocarbon in a refractory-lined catalyst converter was subject to a gradual decrease in efficiency. It was not known, however, as to what the cause was of such decrease in efficiency or how it could be remedied.

The process of the present invention is operative to reduce and in some cases even prevent preignition of reactant gases in converters lined with any kind of refractory which will withstand deterioration under the conditions of operation above-described.

Since it is obvious that many changes and modifications can be made in the details herein disclosed, without departing from the nature and spirit of the invention, it is to be understood that the invention is not to be limited to these details except as set forth in the appended claims.

We claim:

1. In the production of hydrocyanic acid by reacting, in a refractory container, a mixture containing nitric oxide and a gaseous hydrocarbon together with at least one of the gases taken from the group consisting of water vapor, oxygen and nitrogen in the presence of a catalyst containing a metal of the platinum group, said reaction being free from carbon formation, the steps comprising periodically interrupting the reaction, abrading the walls of the refractory which are contacted by said gaseous reaction mixture, and resuming the reaction.

2. In the production of hydrocyanic acid by reacting, in a refractory container, a mixture containing nitric oxide and a gaseous hydrocarbon together with at least one of the gases taken from the group consisting of water vapor, oxygen and nitrogen in the presence of a catalyst containing a metal of the platinum group, said reaction being free from carbon formation, the steps comprising periodically interrupting the reaction, cooling the refractory container, abrading the walls of the refractory which are contacted by said gaseous reaction mixture and resuming the reaction.

3. In the production of hydrocyanic acid by reacting, in a refractory container, a mixture containing nitric oxide and a gaseous hydrocarbon together with at least one of the gases taken from the group consisting of water vapor, oxygen and nitrogen in the presence of a catalyst containing a metal of the platinum group, said reaction being free from carbon formation, the steps comprising periodically interrupting the reaction, cooling the refractory container, abrading the walls of the refractory which are contacted by said gaseous reaction mixture, coating said abraded walls with a refractory material and resuming said reaction.

4. In the production of hydrocyanic acid by reacting, in a refractory container, a mixture containing nitric oxide and a gaseous hydrocarbon together with at least one of the gases taken from the group consisting of water vapor, oxygen and nitrogen in the presence of a catalyst containing a metal of the platinum group, said reaction being free from carbon formation, the steps comprising periodically interrupting said reaction, cooling the refractory container, abrading the walls of the refractory which are contacted by said gaseous reaction mixture, coating said abraded walls with a refractory cement, and resuming said reaction.

5. In the production of hydrocyanic acid by reacting, in a sillimanite refractory container, a mixture containing nitric oxide and a gaseous hydrocarbon together with at least one of the gases taken from the group consisting of water vapor, oxygen and nitrogen in the presence of a catalyst containing a metal of the platinum group, said reaction being free from carbon formation, the steps comprising periodically interrupting said reaction, cooling the refractory container, abrading the walls of the refractory which are contacted by said gaseous reaction mixture, coating said abraded walls with a sillimanite refractory cement, and resuming said reaction.

6. In the production of hydrocyanic acid, in a refractory container, by passing a mixture containing nitric oxide and a gaseous hydrocarbon together with at least one of the gases taken from the group consisting of water vapor, oxygen and nitrogen through a catalyst bed comprising a metal of the platinum group covered with a layer of inert refractory material, said reaction being free from carbon formation, the steps comprising periodically interrupting the reaction, abrading the walls of the refractory which are contacted by said gaseous reaction mixture, renewing at least the top of said inert refractory material, and resuming the reaction.

7. In the production of hydrocyanic acid, in a refractory container, by passing a mixture containing nitric oxide and a gaseous hydrocarbon together with at least one of the gases taken from the group consisting of water vapor, oxygen and nitrogen through a catalyst bed comprising a metal of the platinum group covered with a layer of inert refractory material, said reaction being free from carbon formation, the steps comprising periodically interrupting the reaction, abrading the walls of the refractory which are contacted by said gaseous reaction mixture, coating the abraded walls with a refractory material, renewing at least the top of said inert refractory material, and resuming the reaction.

HOWARD DONOVAN GREEN.
PHILIP ROE HENDRIXSON.